April 29, 1952     G. A. BLESSEN     2,594,386
ANTIGLARE SHADE FOR WINDSHIELDS
Filed March 21, 1950
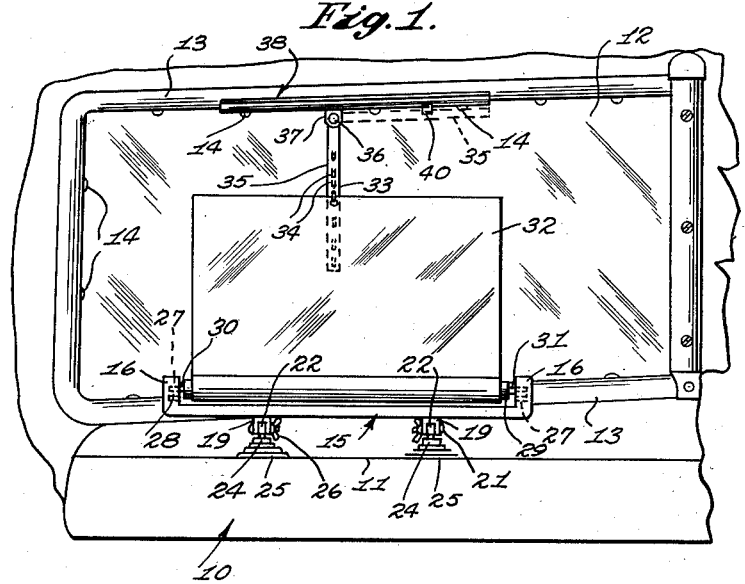
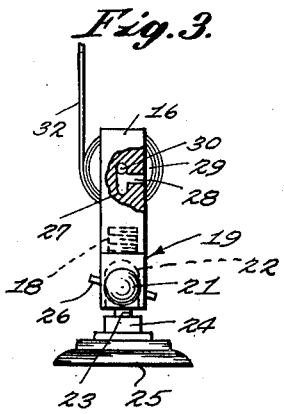
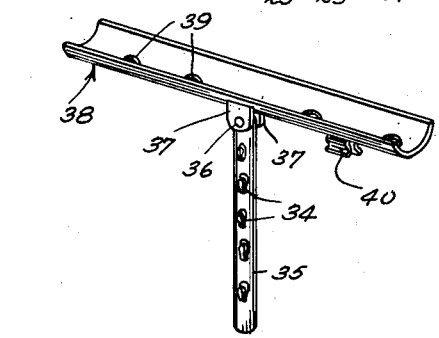
INVENTOR.
GUS A. BLESSEN
BY
McMorrow, Berman & Davidson
ATTORNEYS Patented Apr. 29, 1952

2,594,386

UNITED STATES PATENT OFFICE 2,594,386

ANTIGLARE SHADE FOR WINDSHIELDS

Gus A. Blessen, Richmond, Calif.

Application March 21, 1950, Serial No. 150,998

2 Claims. (Cl. 296—97)

My invention relates to an anti-glare shade for automobile windshields and the like.

An important object of my invention is to provide a roll type, anti-glare shield or shade for automobile windshields including means for mounting the shade upon the dashboard of the automobile adjacent to the bottom of the windshield, so that the shade may be raised and lowered when desired.

A further object is to provide an anti-glare shade of the above-mentioned character which is highly simplified, compact and sturdy in construction.

A further object of the invention is to provide an anti-glare shade for an automobile windshield which is adjustable so that the angle of the shade relative to the windshield may be varied as desired.

A still further object is to provide an anti-glare device of the above-mentioned character which is so constructed that it may be installed upon substantially any conventional automobile or truck.

Other objects and advantages of the invention will be apparent during the course of the following description.

In the accompanying drawings forming a part of this application, and in which like numerals are employed to designate like parts throughout the same:

Figure 1 is a side elevational view of an anti-glare shade embodying my invention and illustrating the use of the same;

Figure 2 is an enlarged fragmentary side elevational view of the anti-glare shade removed, parts in section;

Figure 3 is an enlarged end elevational view of the anti-glare shade removed, parts broken away; and Figure 4 is a perspective view of a shade attaching rod and mounting plate removed.

In the drawings, where, for the purpose of illustration, is shown a preferred embodiment of my invention, the numeral 10 designates generally the dashboard of an automobile which may include a substantially horizontal, flat or level ledge 11. The automobile windshield 12 is disposed above the dishboard and includes the usual marginal sheet metal trim or molding 13 rigidly secured in place by means of spaced screws 14 or the like.

My anti-glare shade comprises an elongated, horizontal mounting bracket or bar 15 provided at its opposite ends with short, upstanding, vertical extensions or arms 16 formed integrally with the bar 15. Near and inwardly of the opposite ends of the bar 15, it is provided in its bottom with screw-threaded openings 17 for receiving top screw-threaded extensions 18 of depending brackets 19 which are bifurcated for forming laterally spaced, depending, apertured lugs or knuckles 20. Transverse pivot bolts 21 are mounted upon the apertured lugs 20, as shown, and short, vertical plates or legs 22 have their top ends apertured and are pivotally mounted upon the bolts 21 between the lugs 20, Figure 2. The plates or legs 22 include integral, short, depending, screw-threaded extensions 23 engaging within the tops of screw-threaded cups or sockets 24. Rubber suction cups 25 are firmly secured to the bottoms of the cups or sockets 24, as shown, and these suction cups 25 are adapted to engage the flat ledge 11 of the dashboard in the usual manner for supporting the bracket or bar 15 horizontally adjacent to the bottom of the windshield 12, Figure 1. As shown clearly in the drawings, the brackets 19, plates 22 and associated elements constitute spaced legs for the bar 15, so that it may be supported at the proper elevation adjacent to the bottom edge of the windshield. As previously stated, the plates 22 are pivotally mounted upon the bolts 21, so that the suction cups 25 may be adjusted to the desired angle with respect to the bar 15, and winged nuts 26 are mounted upon the bolts 21, and when tightened, serve to releasably clamp the plates 22 and suction cups in the selected adjusted positions.

While I have shown the dashboard 10 provided with the level ledge 11, it is well known that the dashboards of many conventional automobiles are curved in transverse cross-section or angularly inclined adjacent to the bottom of the windshield. For this reason, I have made the plates 22 and suction cups angularly adjustable, as previously described, so that regardless of the shape or contour of the dashboard, the arms or extensions 16 may be vertically disposed or arranged at any desired inclination with respect to the windshield 12, or substantially parallel to the windshield.

The upstanding arms 16 are provided in their inner opposed faces with substantially T-shaped recesses or slots, Figure 3, including vertical sections or portions 27 and horizontal entrance portions or passages 28, which lead into the vertical portions 27 at their longitudinal centers, Figure 3. The horizontal portions or passages 28 of the T-shaped recesses extend through the rear sides of the upstanding arms 16, or their sides remote from the windshield 12, Figure 1.

Arranged between the upstanding arms 16 and near and above the bar 15 is a conventional, spring actuated shade roller 29 of the type generally employed with conventional window shades. The shade roller 29 is horizontally disposed and extends for substantially the entire distance between the arms 16, as shown. The shade roller is provided at its opposite ends with the usual trunnions 30 and 31 which are adapted to engage in the T-shaped slots or recesses of the arms 16. The trunnions 30 and 31 are introduced into the T-shaped recesses through the entrance passages 28, so that when the shade roller 29 is mounted upon the bracket 15 in its operative position, the trunnions 30 and 31 are disposed within the vertical portions 27 of the T-shaped recesses. As is conventional with shade rollers, the trunnion 30 is cylindrical and freely rotatable within the vertical slot portion 27, while the opposite trunnion 31 is flat and rectangular in transverse cross-section, so that it cannot rotate within its associated slot portion 27. As is obvious, the shade roller 29 is readily detachable from the bracket or bar 15 by passing the trunnions 30 and 31 through the horizontal passages 28.

A flexible, transparent cloth or plastic sheet 32 has one end secured to the roller 29 in any conventional manner, and the sheet 32 is adapted to be rolled upon the roller 29 and unrolled or extended therefrom for the desired life in the same manner that a conventional window shade is raised and lowered. The transparent sheet 32 is colored or tinted with a suitable color, such as green, for reducing glare due to oncoming headlights, the reflection of the sun upon the highway, or reflection from various bright objects. The sheet 32 is sufficiently flexible to be readily wound upon the shade roller 29, but it is also sufficiently stiff to maintain its shape when unrolled or extended above the bracket 15 and across the windshield in the manner illustrated in Figure 1. The width of the glare eliminating sheet 32 is preferably such that it extends for substantially the entire length of the roller 29 and for substantially the entire distance between the arms 16. The length of the sheet 32 is such that it may be readily extended across the entire vertical width of the windshield 12.

An attaching ring or eye 33 is secured to the free edge of the sheet 32 at its transverse center, Figure 1, and this ring 33 is adapted to engage over any one of a plurality of longitudinally spaced, upwardly directed hooks or lugs 34 formed upon a depending vertical adjustment rod or strap 35 having its top end pivotally connected, as at 36, between a pair of depending, apertured lugs 37, in turn rigidly mounted upon the bottom of an elongated, substantially horizontal, arcuate mounting plate or strip 38. This mounting plate 38 is preferably transversely curved or arcuate, as previously stated, so that it will conform to the shape of the ornamental molding or trim 13 of the windshield. However, I also contemplate forming the mounting strip 38 flat, and when thus made, the mounting strip will serve the same purpose to be described. The mounting strip or plate 38 is preferably provided with a plurality of longitudinally spaced openings 39, adapted to register with certain of the openings in the molding 13 which accommodate the screws 14. With this arrangement, certain of the molding screws 14 are removed and the arcuate mounting strip 38 is fitted against the molding 13 with its openings 39 registering with the screw openings of the molding. The removed screws 14 are then reinserted through the openings 39 of the mounting strip, and thus serve for detachably, rigidly securing the mounting strip 38 to the top of the molding 13, Figure 1, directly above the bracket or bar 15. A suitable spring clip 40 is secured to the bottom of the mounting strip 38 near and inwardly of one end of the mounting strip and to one side of the lugs 37, which are arranged at the longitudinal center of the mounting strip. The arrangement is such that when the ring 33 is disconnected from the particular hook 34, and the sheet 32 is lowered and rolled upon the roller 29, the strap or rod 32 may be swung upwardly for engagement with the spring clip 40. As shown in dotted lines in Figure 1, the spring clip 40 will releasably hold the rod or strap 35 in a substantially horizontal or elevated position close to the mounting strip 38.

It is preferred that the rod or strap 35 be formed of some suitable light and sufficiently strong plastic material, although the strap may be formed of sheet metal or any other sufficiently light and durable material, if desired. In like manner, the mounting strip 38 may be formed of sheet metal or of some suitable plastic material. Also, the mounting bracket or bar 15 and associated elements may be formed of some suitable plastic material or of metal.

In use, my anti-glare shade is mounted adjacent to the inner side of the windshield 12 in the manner shown in the drawings and previously described. The suction cups 25 are firmly secured to the dashboard, regardless of its shape or contour in transverse cross-section, and the wing nuts 26 are loosened so that the mounting bracket 15 may be adjusted angularly with respect to the dashboard and windshield. If desired, the upstanding arms 16 may be adjusted vertically and arranged substantially in vertical alignment with the top molding or trim 13 of the windshield. With this arrangement, the sheet 32 will be vertically disposed when raised above the roller 29 and across the windshield. If desired, the bracket 15 may be angularly adjusted about the bolts 21 so that the arms 16 are parallel to the windshield 12, which is usually inclined with respect to the vertical. In this manner, the bracket 15 may be adjusted so that the extended or raised sheet 32 may assume substantially any desired inclination with respect to the windshield 12. Obviously, when the wing nuts 26 are tightened, the bracket 15 will be releasably clamped in the selected adjusted position. When the sheet 32 is extended or raised, the attaching ring 33 may engage over any selected hook 34 of the strap 35, so that the sheet may be positioned at the desired elevation.

When the sheet 32 is in the extended or raised position, it will be under some tension, due to the spring action of the roller 29. Under this condition, the trunnions 30 and 31 will shift to the tops of the vertical slot portions 27, as shown in Figure 3. When in such positions, there is no liability of the trunnions passing out of the passages 28 and becoming accidentally disengaged from the bracket 15. Likewise, when the sheet 32 is lowered or rolled upon the roller 29, the trunnions 30 and 31 will shift to the bottoms of the slot portions 27, and below the horizontal passages 28, so that again there is no liability of the trunnions accidentally passing through the passages 28 and becoming disengaged from the mounting bracket. The only time that the trunnions may pass through the openings or passages 28 is when the shade roller 29 is held elevated so that the trunnions 30 and 31 are in alignment or registration with the horizontal passages 28. When this is done, the trunnions may be passed through the horizontal passages 28, so that the roller 29 may be removed.

The device is highly simplified, compact and sturdy in construction. When the sheet 32 is lowered and completely rolled upon the roller 29, the strap 35 is swung upwardly to its stowed or inoperative position, and with this arrangement no parts of the device can block the vision of the driver. The device is relatively inexpensive to manufacture and is adaptable to substantially any automobile or truck. I have found that it is extremely effective for eliminating bothersome road glare, glare from approaching headlights and other bright objects.

It is to be understood that the form of the invention herewith shown and described is to be taken as a preferred example of the same, and that various changes in shape, size and arrangement of parts may be resorted to without departing from the spirit of the invention or the scope of the subjoined claims.

Having thus described my invention, I claim:

1. A glare shade for an automobile windshield having a marginal molding, there being a dashboard adjacent to the bottom of the windshield, said glare shade comprising a substantially horizontal elongated low mounting bar arranged adjacent to the bottom of the windshield, attaching means secured to the mounting bar for detachably securing it to the dashboard, a substantially horizontal shade roller journaled upon the mounting bar and arranged close to the top of the mounting bar and adjacent to the bottom of the windshield, a flexible glare eliminating sheet wound upon the shade roller and adapted to be unwound therefrom, an attaching element secured to the free edge of the sheet near the transverse center of the sheet, an elongated mounting strip secured to the marginal molding at the top of the windshield and disposed above the roller and mounting bar, an elongated depending strap having its top end pivotally secured to the mounting strip near the longitudinal center of the mounting strip and arranged near the transverse center of the sheet, the depending strap including a plurality of longitudinally spaced hooks, the attaching element of the sheet being engageable with any of the hooks of the strap for releasably holding the sheet in an elevated position, and a spring clip secured to the mounting strip near one end thereof and adapted to engage the strap for holding it elevated and adjacent to the top of the windshield when the strap is swung upwardly beneath the mounting strip.

2. An anti-glare shade for an automobile windshield, the automobile having a dashboard arranged below the windshield, the anti-glare shade comprising a substantially horizontal elongated low mounting bar arranged adjacent to the bottom of the windshield, short longitudinally spaced depending brackets secured to the bottom of the mounting bar, suction cup means pivotally connected with the depending brackets and engageable with the dashboard so that the mounting bar may be angularly adjusted with respect to the dashboard and windshield, clamp means connected with the brackets for releasably securing the mounting bar in the selected adjusted angular position, short upstanding arms secured to the opposite end of the mounting bar and projecting above the mounting bar for short distances only, the upstanding arms being provided in their inner opposed faces with substantially T-shaped recesses including vertical portions and horizontal entrance portions leading into the vertical portions near the longitudinal centers of the vertical portions, a substantially horizontal shade roller disposed between the upstanding arms and near and above the top of the mounting bar and adjacent to the bottom of the windshield, the shade roller including trunnions insertable through the horizontal portions of the substantially T-shaped recesses into the vertical portions thereof, a flexible glare eliminating sheet mounted upon the shade roller and adapted to be rolled upon and unrolled therefrom, an attaching element secured to the sheet near its free edge, and attaching means mounted upon the automobile near the top of the windshield for engagement with the attaching element of the sheet to releasably hold the sheet in an elevated position adjacent to the windshield.

GUS A. BLESSEN.

REFERENCES CITED

The following references are of record in the file of this patent:

UNITED STATES PATENTS

| Number | Name | Date |
|---|---|---|
| 1,566,646 | Brewster et al. | Dec. 22, 1925 |
| 2,501,250 | Wilson | Mar. 21, 1950 |
| 2,547,373 | Camp | Apr. 3, 1951 |

FOREIGN PATENTS

| Number | Country | Date |
|---|---|---|
| 244,277 | Great Britain | Dec. 17, 1925 |
| 513,642 | Germany | Dec. 10, 1929 |